(12) United States Patent
Hsueh et al.

(10) Patent No.: US 7,420,803 B2
(45) Date of Patent: Sep. 2, 2008

(54) UNIVERSAL SERIAL BUS FLASH DRIVE WITH DEPLOYING AND RETRACTING FUNCTIONALITIES

(75) Inventors: Paul Hsueh, Concord, CA (US); Jin Kyu Kim, San Jose, CA (US); Nan Nan, San Jose, CA (US); David Nguyen, San Jose, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 0 days.

(21) Appl. No.: 11/682,261

(22) Filed: Mar. 5, 2007

(65) Prior Publication Data

US 2007/0184685 A1    Aug. 9, 2007

Related U.S. Application Data

(63) Continuation-in-part of application No. 11/466,759, filed on Aug. 23, 2006, and a continuation-in-part of application No. 11/112,501, filed on Apr. 21, 2005, now Pat. No. 7,269,004, which is a continuation-in-part of application No. 10/789,333, filed on Feb. 26, 2004, now Pat. No. 7,318,117, which is a continuation-in-part of application No. 09/478,720, filed on Jan. 6, 2000, now Pat. No. 7,257,714.

(51) Int. Cl.
*G06F 1/16* (2006.01)

(52) U.S. Cl. ............... 361/686; 361/752; 361/753; 361/736; 361/737

(58) Field of Classification Search ......... 439/140–141, 439/135–137, 131; 401/195; 361/686, 752–753, 361/736–737
See application file for complete search history.

(56) References Cited

U.S. PATENT DOCUMENTS

| 6,737,591 | B1* | 5/2004 | Lapstun et al. ............ 178/19.05 |
| 7,004,780 | B1* | 2/2006 | Wang ............................ 439/353 |
| 7,214,075 | B2* | 5/2007 | He et al. ....................... 439/135 |
| 2005/0009388 | A1* | 1/2005 | Chao ............................ 439/135 |
| 2005/0271458 | A1* | 12/2005 | Kui ............................... 401/195 |
| 2006/0234533 | A1* | 10/2006 | Lei et al. ....................... 439/135 |

* cited by examiner

*Primary Examiner*—Dean A. Reichard
*Assistant Examiner*—Andargie M Aychillhum
(74) *Attorney, Agent, or Firm*—Law Offices of Imam

(57) ABSTRACT

A universal serial bus (USB) flash drive pen device for deploying and retracting a USB plug connector having a pusher assembly including a USB flash drive and a USB plug connector, in accordance with an embodiment of the present invention. The USB flash drive pen device further includes a housing assembly at least partially enclosing said pusher assembly for deploying said USB plug connector, said USB flash drive being coupled to said USB plug connector, said pusher assembly retracting said USB plug connector into said housing assembly, said USB flash drive pen device for deploying said USB plug connector to couple said USB flash drive to a USB port.

19 Claims, 14 Drawing Sheets

UNIVERSAL SERIAL BUS FLASH DRIVE WITH DEPLOYING AND RETRACTING FUNCTIONALITIES

CROSS REFERENCE TO RELATED APPLICATIONS

This application is a continuation-in-part of U.S. patent application Ser. No. 09/478,720 filed on Jan. 6, 2000, now U.S. Pat. No. 7,257,714 and entitled "ELECTRONIC DATA STORAGE MEDIUM WITH FINGERING VERIFICATION CAPABILITY", and a continuation-in-part of U.S. patent application Ser. No. 11/466,759 filed on Aug. 23, 2006, and entitled "FLASH MEMORY CONTROLLER FOR ELECTRONIC DATA FLASH CARD" which is a continuation-in-part of U.S. patent application Ser. No. 10/789,333 filed on Feb. 26, 2004, now U.S. Pat. No. 7,318,117 and entitled "SYSTEM AND METHOD FOR CONTROLLING FLASH MEMORY.", and a continuation in part of U.S. patent application Ser. No. 11/112,501 filed on Apr. 21, 2005, now U.S. Pat. No. 7,269,004 and entitled "LOW-PROFILE USB DEVICE" all of which are incorporated herein by reference as though set forth in full.

BACKGROUND OF THE INVENTION

1. Field of the Invention

The present invention relates generally to the field of universal serial bus (USB) flash drives and particularly to a method and apparatus for designing USB flash drives having pen-like configuration with deploying and retracting functionalities.

2. Description of the Prior Art

As computers have gained enormous popularity in recent decades, so has the need for better and more efficient ways of storing memory. Notable among memory devices are the portable ones that may be carried around by the user to access computers at different locations. This is particularly common in the case of personal computers (PC) where the need often arises to transfer data from one PC to another. Examples of portable memory devices include nonvolatile memory devices such as a universal serial bus (USB) flash drive that is removably connectible to a computer.

Universal serial bus (USB) flash drives are available in various shapes and forms. The USB flash drive needs a USB plug connector to be coupled to a USB port of a host device such as a PC. The USB flash drive generally has a metal casing and a cover which is screwed in or otherwise attached to the casing. To access the USB plug connector the user needs to open the metal cover and put it back on the casing after finishing the work with the USB flash drive. The shape of the casing and cover may be in the form of a pen or some other configuration.

However, use of the metallic parts such as the casing and the cover generally results in a heavy USB flash drive which is not very convenient to carry. The dimensions of the casing and cover are often large resulting in a long USB flash drive which is another impediment to easy carriage of the unit. In addition, once the cover is removed, it may be lost or simply forgotten to be put back on the casing.

It is therefore desirable to design and develop a USB flash drive with a relatively short and compact configuration that is light and may therefore be easily carried around by the user. In addition, the desired USB flash drive should not incur substantial cost of manufacturing but should rather improve the manufacturing and assembly process over the existing USB flash drives with metallic components.

SUMMARY OF THE INVENTION

Briefly, an embodiment of the present invention includes a universal serial bus (USB) flash drive pen device for deploying and retracting a USB plug connector having a pusher assembly including a USB flash drive and a USB plug connector. The USB flash drive pen device further includes a housing assembly at least partially enclosing said pusher assembly for deploying said USB plug connector, said USB flash drive being coupled to said USB plug connector, said pusher assembly retracting said USB plug connector into said housing assembly, said USB flash drive pen device for deploying said USB plug connector to couple said USB flash drive to a USB port.

The foregoing and other objects, features and advantages of the present invention will be apparent from the following detailed description of the preferred embodiments which make reference to several figures of the drawing.

IN THE DRAWINGS

Figure 2:
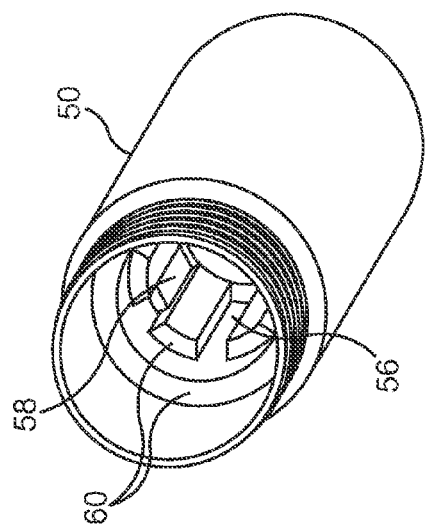
FIG. 2 shows a detailed view of the deploying subassembly 17, in accordance with an embodiment of the present invention.
Figure 2:
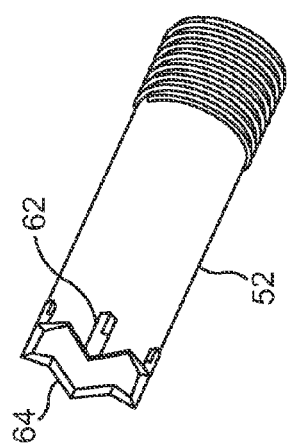
Figure 2:
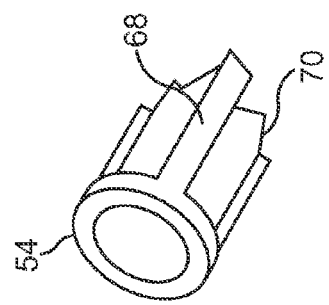
Figure 2A:
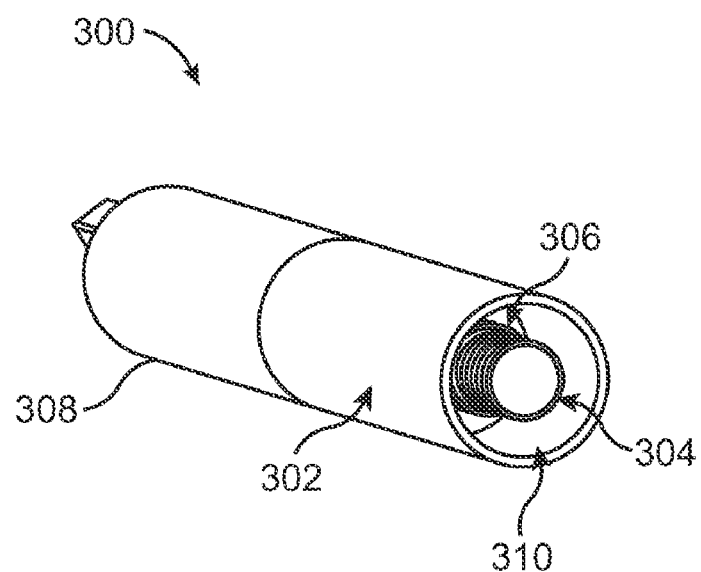
FIG. 2(a) shows a USB flash drive pen device 300 without an end cap, in accordance with an embodiment of the present invention.
Figure 2B:
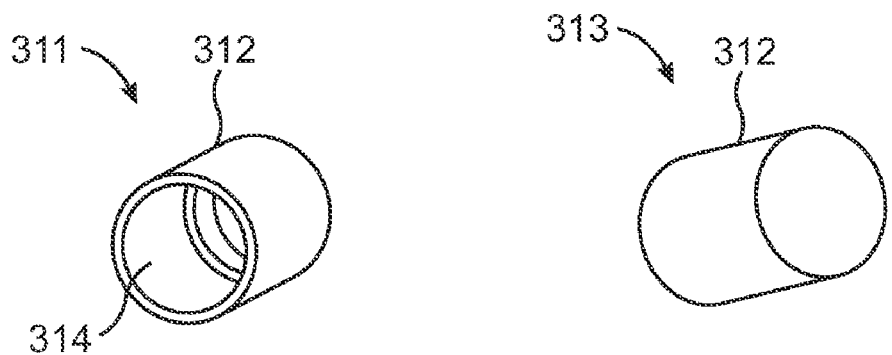

FIG. 2(b) shows two end views 311 and 313 of an end cap 312, in accordance with an embodiment of the present invention.

Figure 2C:
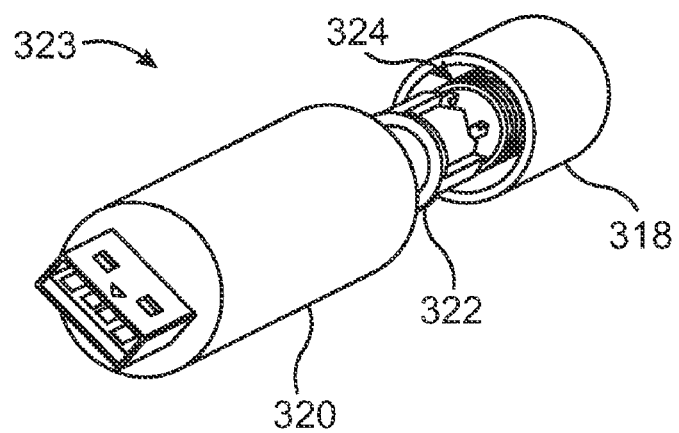

FIG. 2(c) shows a USB flash drive pen device 323 without a back tube, in accordance with an embodiment of the present invention.

Figure 2D:
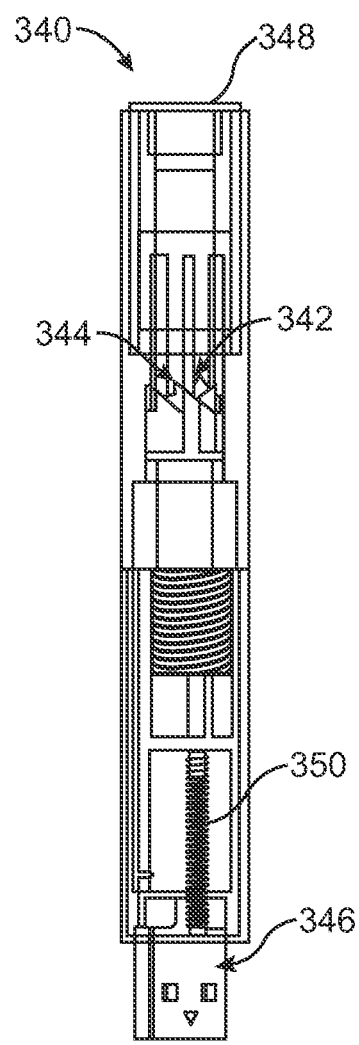

FIG. 2(d) shows a USB flash drive pen device 340, in accordance with an embodiment of the present invention.

Figure 2E:
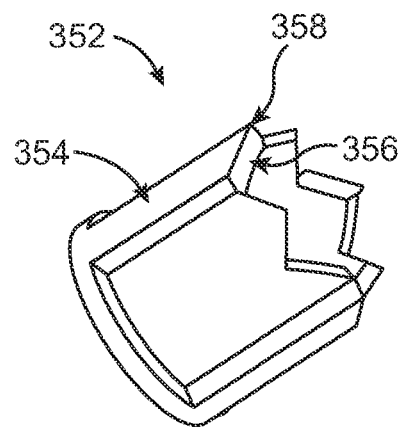

FIG. 2(e) shows an inner-rotator 352, in accordance with an embodiment of the present invention.

Figure 2F:
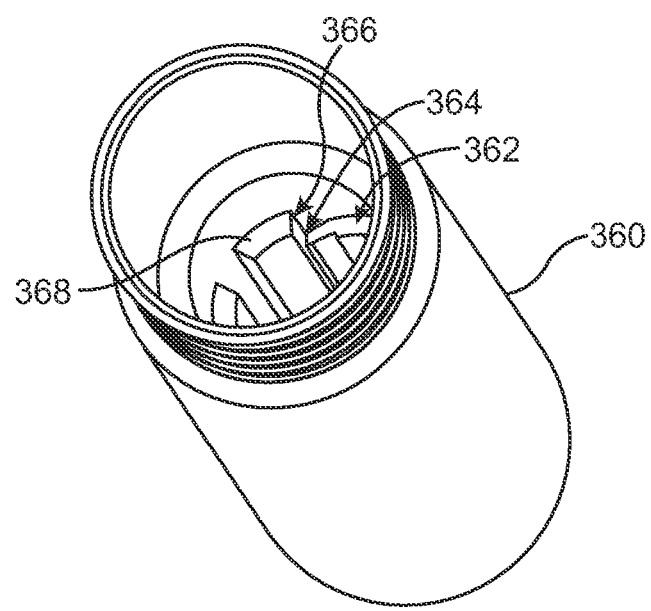

FIG. 2(f) shows a back tube 360, in accordance with an embodiment of the present invention.

Figure 2G:
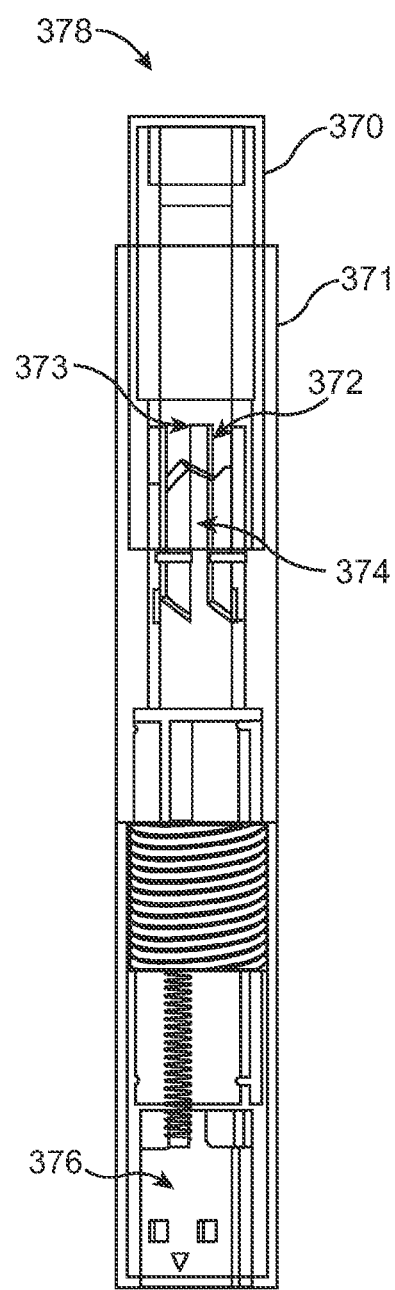

FIG. 2(g) shows a USB flash drive pen device 378, in accordance with an embodiment of the present invention.

Figure 3:
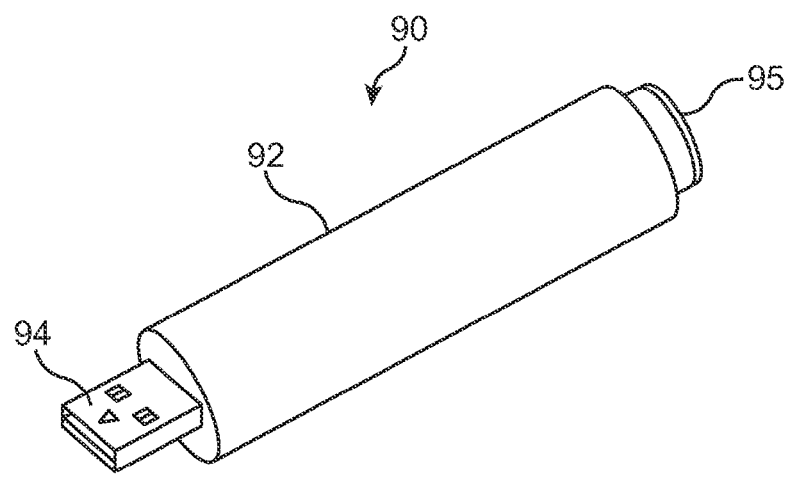

FIG. 3 shows an alternative embodiment of the USB flash drive pen device 90, in accordance with an embodiment of the present invention.

Figure 4:
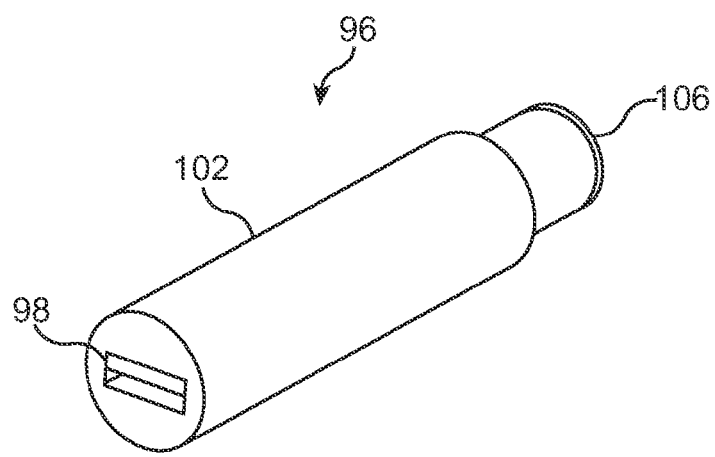

FIG. 4 shows a USB flash drive pen device 96 in the retracted position, in accordance with an embodiment of the present invention.

Figure 5A:
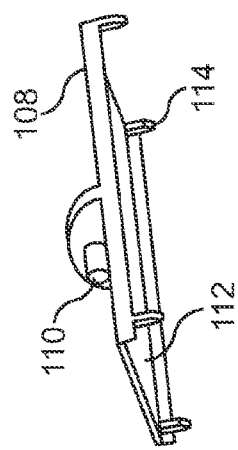

FIG. 5(a) shows a cover top 108 is shown, in accordance with an embodiment of the present invention.

Figure 5C:
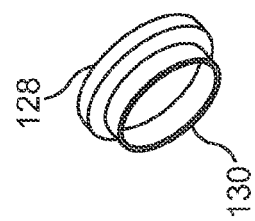
Figure 5B:
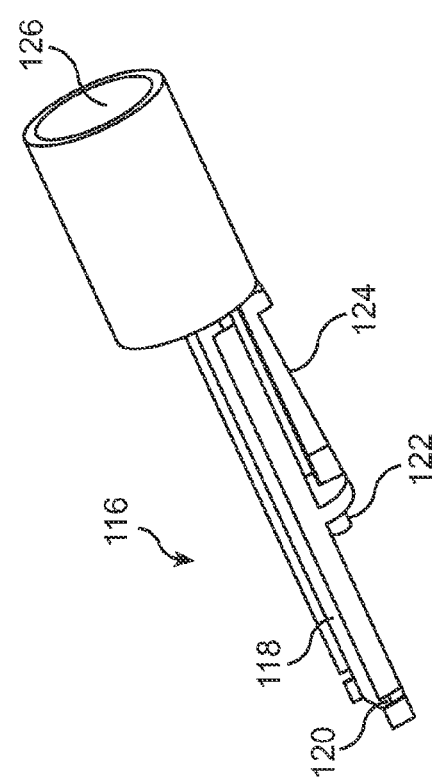

FIG. 5(b) shows a button bottom assembly 116, in accordance with an embodiment of the present invention.

FIG. 5(c) shows an end cap 128, in accordance with an embodiment of the present invention.

Figure 5D:
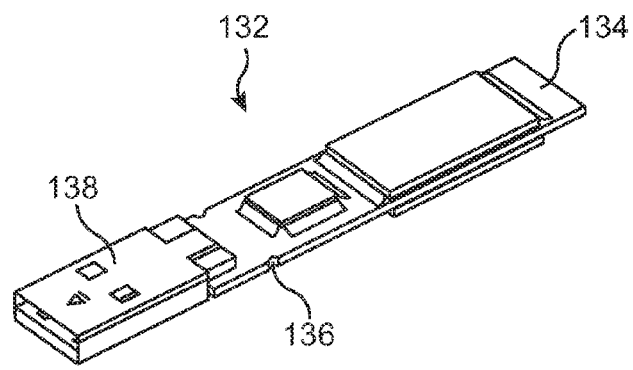

FIG. 5(d) shows a standard printed circuit board (PCB) assembly 132, in accordance with an embodiment of the present invention.

Figure 5E:
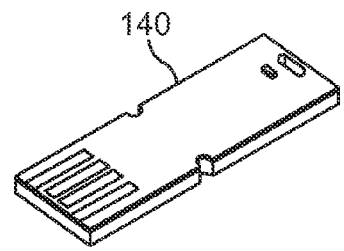

FIG. 5(e) shows a chip on board (COB) PCB assembly 140, in accordance with an embodiment of the present invention.

Figure 5F:
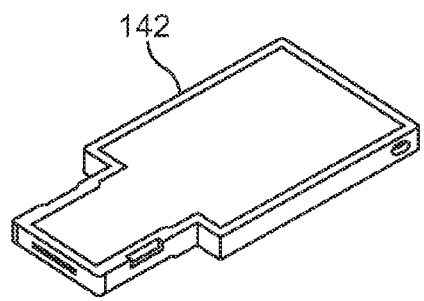

FIG. 5(f) shows a super-slim PCB assembly 142, in accordance with an embodiment of the present invention.

Figure 6A:
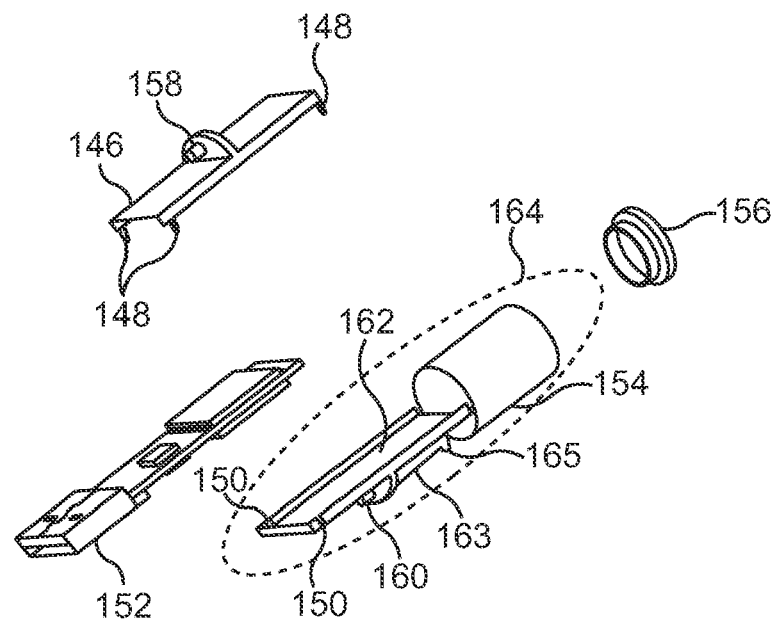

FIG. 6(a) shows a detail view of the internal components of a pusher assembly, in accordance with an embodiment of the present invention.

Figure 6B:
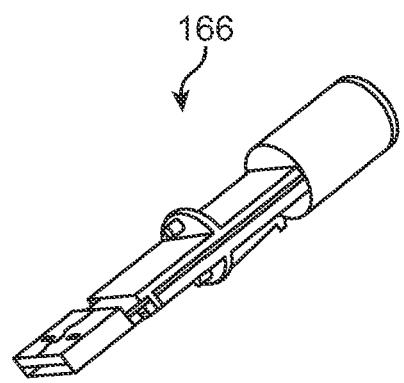

FIG. 6(b) shows an assembled view of the pusher assembly 166, in accordance with an embodiment of the present invention.

Figure 7A:
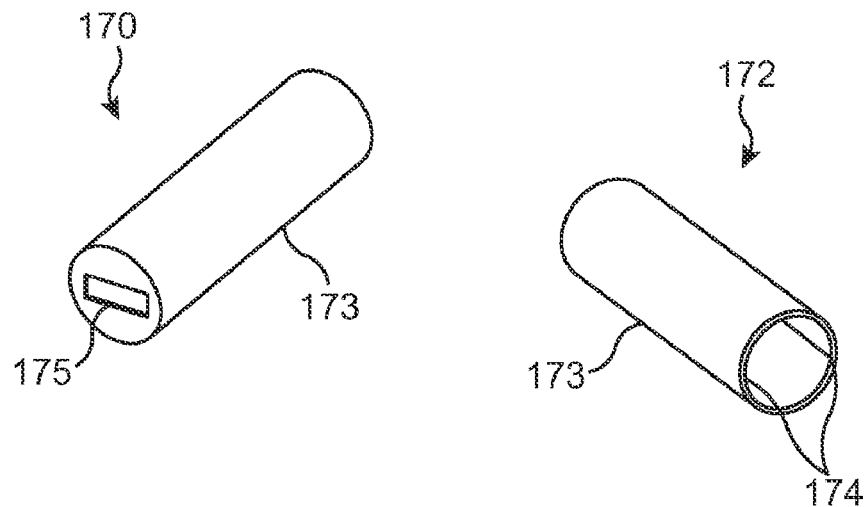

FIG. 7(a) shows a front view 170 and a back view 172 of a housing unit 173, in accordance with an embodiment of the present invention.

Figure 7B:
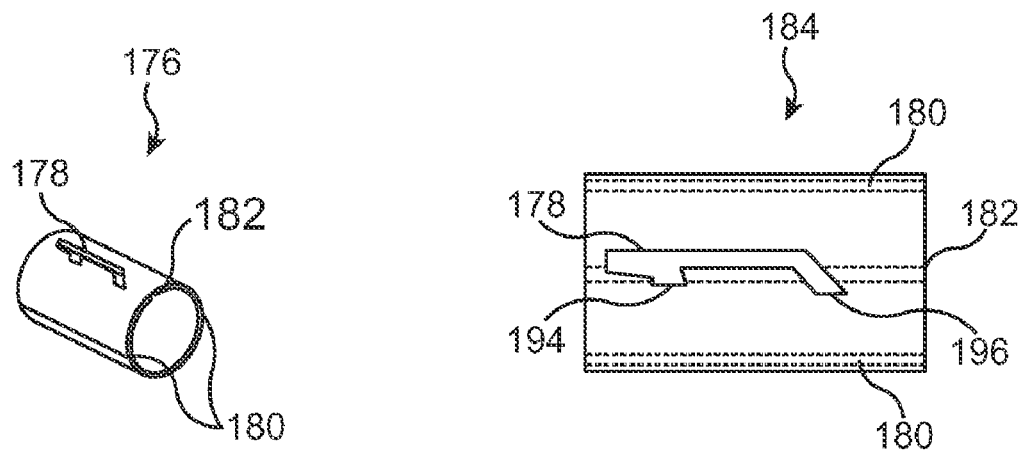

FIG. 7(b) shows a stopper unit 176, in accordance with an embodiment of the present invention.

Figure 8A:
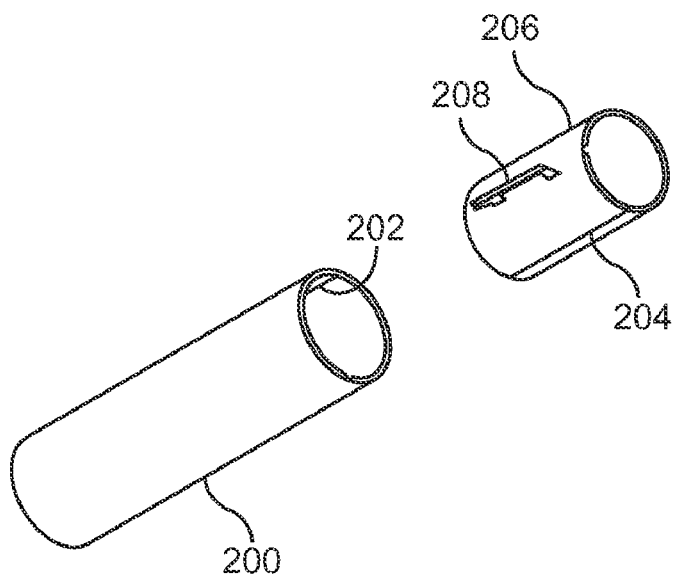

FIG. 8(a) shows the internal components of a housing assembly, in accordance with an embodiment of the present invention.

Figure 8B:
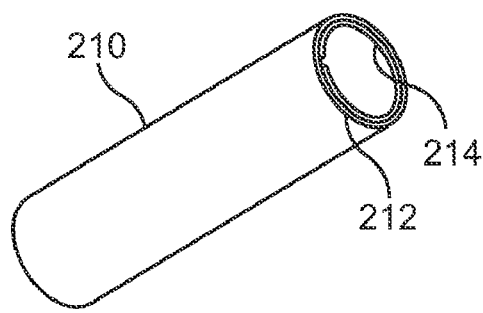

FIG. 8(b) shows an assembled view of the housing assembly 210, in accordance with an embodiment of the present invention.

Figure 9A:
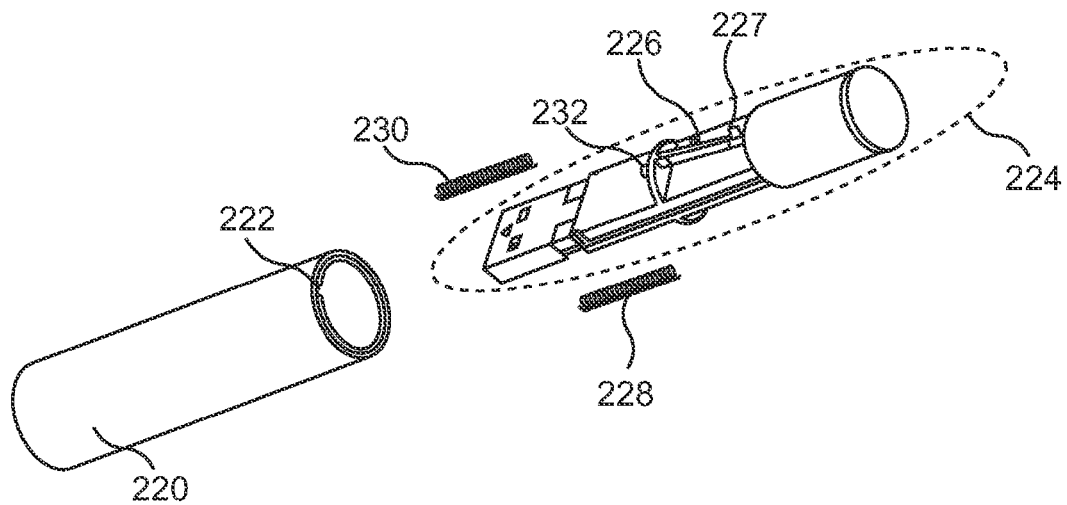

FIG. 9(a) shows the internal components of a USB flash drive pen device, in accordance with an embodiment of the present invention.

Figure 9B:
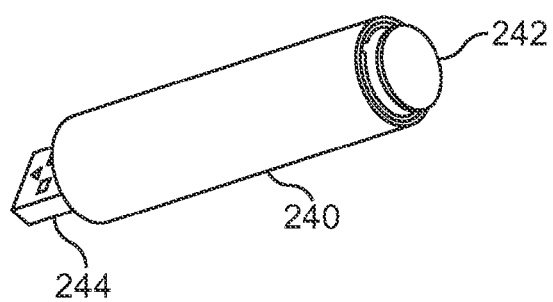

FIG. 9(b) shows an assembled view of a USB flash drive pen device 240, in accordance with an embodiment of the present invention.

DETAILED DESCRIPTION OF THE PREFERRED EMBODIMENTS

Figure 1:
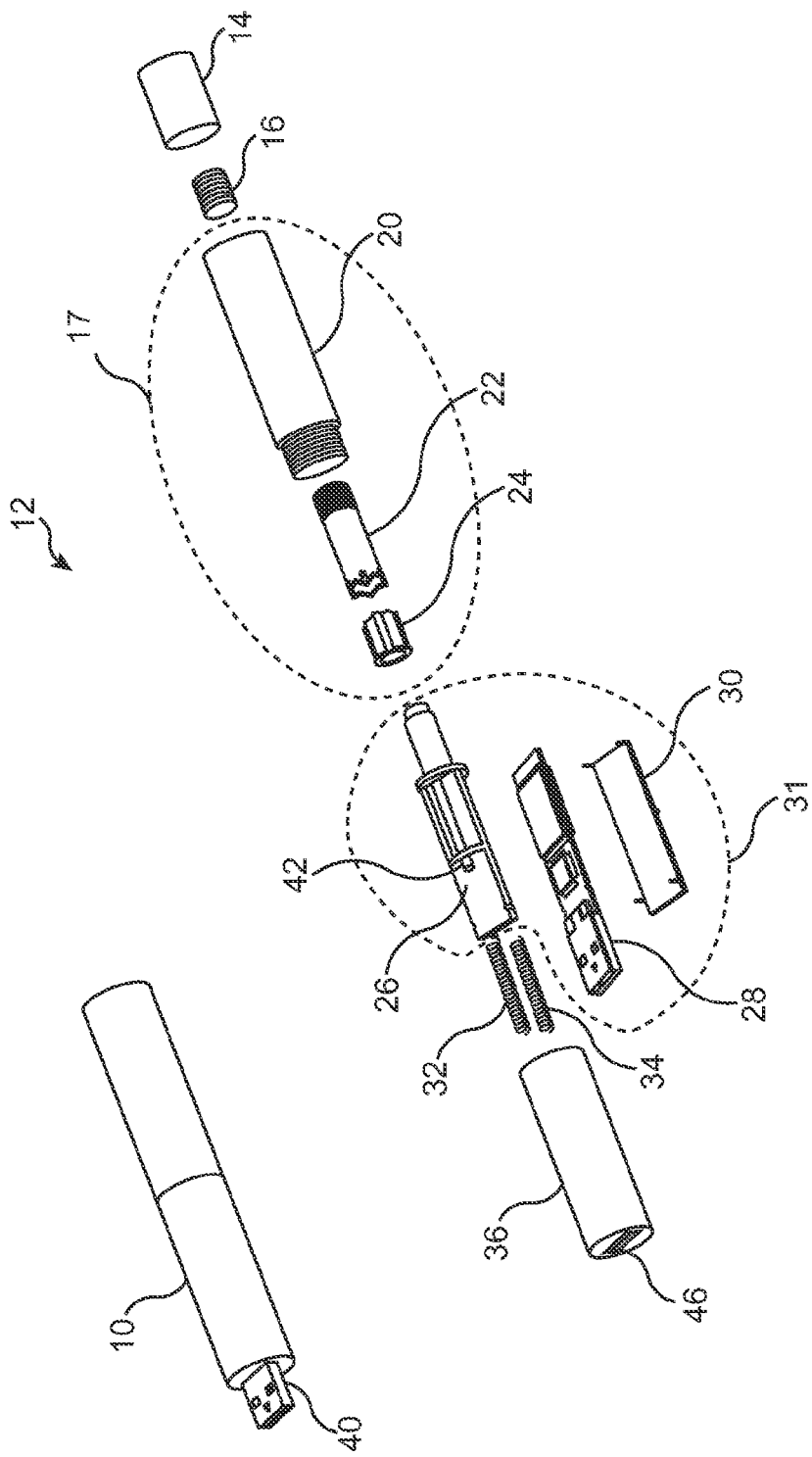
FIG. 1 shows a universal serial bus (USB) flash drive pen device 10, in accordance with an embodiment of the present invention.

Referring now to FIG. 1, a universal serial bus (USB) flash drive pen device 10 is shown, in accordance with an embodiment of the present invention. The USB flash drive pen device 10 includes a USB plug connector 40 shown in FIG. 1 to be in the deployed position. The USB plug connector 40 may be retracted back into the USB flash drive pen device 10 by pressing an end cap as in a pen and carried in a dress pocket without damaging the USB plug connector 40. The end cap may be pressed again to deploy the USB plug connector 40 for connection to a USB port of a host device such as a computer.

Also shown in FIG. 1 is a detailed view 12 of the internal components of the USB flash drive pen device 10, in accordance with an embodiment of the present invention. Shown in the detailed view 12 are an end cap 14, a spring 16, a deploying subassembly 17, a pusher assembly 31, two springs 32 and 34 and a front tube 36. The deploying subassembly 17 includes a back tube 20, a pusher unit 22 and an inner-rotator 24. The pusher assembly 31 includes a button bottom assembly 26, a printed circuit board (PCB) assembly 28 and a cover top 30.

The spring 16 is positioned inside the end cap 14 which is screwed to one end of the pusher unit 22. Spring 16 is positioned to be in contact with the end cap 14 on one end and with the back tube 20 on the other end. The end cap 14 functions as an end button so that when pressed in the USB plug connector 40 is deployed and when pushed again and released the USB plug connector 40 is retracted.

The inner-rotator 24 is in contact with one end of the button bottom assembly 26. The PCB assembly 28 slides into the button bottom assembly 26 to be secured thereon. The cover top 30 is secured onto the button bottom assembly 26 by snapping four tabs on the cover top 30 into four slots on the button bottom assembly 26 to comprise the pusher assembly 31. Thus the cover top 30 provides a protecting cover for the PCB assembly 28. The two springs 32 and 34 and the pusher assembly 31 are positioned inside the front tube 36 such that the button bottom assembly 26 is in contact with the springs 32 and 34. There are two pins located on the button bottom assembly 26 one of which, pin 42, is shown and the other one being on the underside of the button bottom assembly 26 is not shown in FIG. 1. One end of each of the springs 32 and 34 rests against one of the pins on the button bottom assembly 26. The back tube 20 is then secured to the front tube 36 by being screwed thereon or through some other mechanism to complete the assembly of the USB flash drive pen device 10.

Once the end cap 14 is pressed the spring 16 is compressed thereby causing the pusher assembly 31 to move forward. Consequently, the USB connector plug 40 being part of the PCB assembly 28, is deployed by being pushed out of the front slot 46 of the front tube 36. When the end cap 14 is pressed again the compressed springs 32 and 34 push against the button bottom assembly 26 to retract the USB plug connector 40 into the front tube 36 similar to the deploying and retracting functions in a pen. The distance traveled by the USB plug connector 40 is controlled by the deploying subassembly 17, as described in more detail in FIG. 2.

In the deployed position, the USB plug connector 40 may be coupled to the USB port of a host device such as a computer. The PCB assembly 28 includes a USB flash drive so that the USB plug connector 40 in the deployed position couples the USB flash drive to the host device to establish communication therebetween. More information on conventional plug connectors may be found in the U.S. patent application Ser. No. 10/845,653 filed on May 13, 2004, and entitled "PORTABLE COMPUTER PERIPHERAL APPARATUS WITH RETRACTABLE PLUG CONNECTOR", all of which are incorporated herein by reference as though set forth in full.

Referring now to FIG. 2, a detailed view of the deploying subassembly 17 is shown to include a back tube 50, a pusher assembly 52 and an inner-rotator 54, in accordance with an embodiment of the present invention. The back tube 50 includes a big groove 56, a small groove 58 and angle cut-outs 60. The pusher unit 52 includes a small tab 62 and angle cut-outs 64. The inner-rotator includes a big tab 68 and angle cut-outs 70.

In the deployed position small tabs 62 are positioned in the small groove 58 and big groove 56 of the bar tube 50 while springs 32 and 34 are compressed. To maintain the USB plug connector 40 in the deployed position the inner-rotator 54 has wedges (not shown in FIG. 2) whose tips stop at the corners of the wedges of the back tube 50, as described in more detail hereinbelow.

For retraction the end cap 14 is pressed again to cause the pusher unit 52 and inner-rotator 54 to move forward allowing the wedges of the inner-rotator 54 to move out of the locked position. The inner-rotator 54 rotates along the wedges of the back tube 50 until the big tabs 68 are inside big grooves 56. Then the compressed springs 32 and 34 push the small tabs 62 all the way to the ends of the small and big grooves 58 and 56, respectfully.

Referring now to FIG. 2(a), a USB flash drive pen device 300 without an end cap is shown to include a front tube 308, a back tube 302, a pusher unit 304 and a spring 306, in accordance with an embodiment of the present invention. The front tube 308 is screwed to the back tube 302.

One end of the back tube 302 has a cut-out to allow the pusher unit 304 to slide therethrough to have one end of the pusher unit 304 being exposed. The end cap (not shown in FIG. 2(a)) is screwed to the end of the pusher unit 304 to close the USB flash driver pen device 300. The spring 306 slides over the end of the pusher unit 304 and through the cut-out 310 to be in contact with the inside of the back tube 302. The end cap is screwed on the pusher unit 304 such that the end of the end cap comes in contact with the spring 306.

Referring now to FIG. 2(b), two end views 311 and 313 of an end cap 312 is shown, in accordance with an embodiment of the present invention. The view 311 shows the end cap 312 having an opening 314 wherein the spring 16 of FIG. 1 is secured. Thus the end cap 312 is in contact with the spring 16 when screwed on the pusher unit 22. The view 313 shows that the other end of the end cap 312 has no opening and is pressed in to either deploy or retract the USB plug connector 40.

Referring now to FIG. 2(c), a USB flash drive pen device 323 without a back tube is shown to include an end cap 318, a spring 324, an inner-rotator 322 and a front tube 320, in accordance with an embodiment of the present invention. The spring 324 is screwed inside the opening 314 of the end cap 318 and slides over a pusher unit which is in contact with an inner-rotator 322. The inner-rotator 322 is in contact with a pusher assembly (not shown in FIG. 2(c)) inside the front tube 320.

Referring now to FIG. 2(d), a USB flash drive pen device 340 is shown to include small tabs 342 of a pusher unit, the wedges 344 of the inner-rotator, a spring 350, an end cap 348 and a USB plug connector 346, in accordance with an embodiment of the present invention. The end cap 348 has been depressed to deploy the USB plug connector 346. In the deployed position the spring 350 is compressed.

In the deployed position, the small tabs 342 of the pusher unit are positioned inside the small and big grooves (58 and 56 of FIG. 2) of the back tube. The inner-rotator and back tube have wedges which lock the pen device 340 in the deployed position. Specifically, the tips of the wedges 344 of the inner-rotator stop at the corners of the wedges of the back tube to maintain the deployed position, as described in more detail hereinbelow.

Referring now to FIG. 2(e), an inner-rotator 352 is shown to include big tabs 354, wedges 356 having tips 358, in accordance with an embodiment of the present invention.

Referring now to FIG. 2(f), a back tube 360 is shown to include wedges 362 having corners 364, wedges 368 with edges 366, in accordance with an embodiment of the present invention. In the deployed position the tips 358 of the wedges 356 stop at the corners 364 of the wedges 362 maintaining the USB flash drive pen device in the deployed position.

To retract the USB plug connector 346 (of FIG. 2(d)) the end button 348 is pressed again to push the pusher unit and inner-rotator 352 forward. This action causes the tips 358 to become free of the edges 366 and rotate along the wedges 368 until big tabs 354 are inside big grooves (56 of FIG. 2). As tips 358 become free of the edges 366 the inner-rotator 352 is no longer in contact with the pusher unit 52 and rotates along the wedges 368. The small tabs 62 of the pusher unit 52 being in the small and big grooves, 58 and 56 respectively, are pushed back by the spring pressure of the spring 350 all the way to the ends of the grooves 58 and 56. The USB plug connector is then in the retracted position. The length of travel of the USB plug connector out of the front tube 320 (in FIG. 2(c)) almost equals the distance the small tabs 62 travel inside the grooves 58 and 56.

The angled cut-outs of the wedges 366 and 356 cause the inner-rotator 352, whenever out of position, to turn and rotate rather than travel back tot the original position.

Referring now to FIG. 2(g), a USB flash drive pen device 378 is shown to include the end cap 370, a USB plug connector 376, a back tube 371, small tabs 372 of a pusher unit and big tabs 374 of an inner-rotator, in accordance with an embodiment of the present invention. The end cap 370 has been pushed out of the back tube 371 to retract the USB plug connector 376.

In the retracted position small tabs 372 are positioned inside small and big grooves of the back tube 371. Small tabs 372 of the pusher unit are stopped at the ends 373 of the grooves of the back tube 371 to lock the USB flash drive pen device 378 in the retracted position.

Referring now to FIG. 3, an alternative embodiment of the USB flash drive pen device 90 is shown to include a housing unit 92, a USB plug connector 94 and an end button 95. The housing unit 92 includes a USB flash drive which is coupled to the USB plug connector 94. The USB plug connector 94 is in the deployed position where the end button 95 has been pushed in. In the deployed position the USB plug connector 94 may be coupled to the USB port of a host device to provide connection between the USB flash device and the host device.

The housing unit 92 is shown to be cylindrical in FIG. 3 but in other embodiments of the present invention the casing may have other cross sections such as square or rectangle or the casing may be cylindrical with varying diameter along the length such as smaller diameter in the middle to provide a better grip for handling.

Referring now to FIG. 4, a USB flash drive pen device 96 in the retracted position is shown to include a housing unit 102, an end cap 106 and a USB plug connector 98, in accordance with an embodiment of the present invention. The end cap 106 has been pressed again to retract the USB plug connector 98 into the housing unit 102. In the retracted position, the USB flash drive pen device 96 may be carried in the pocket without having the risk of damaging the USB plug connector 98 and may be redeployed as desired.

Referring now to FIG. 5(a), a cover top 108 is shown to include a PCB slot channel 112, a pin 110 and four tabs 114, in accordance with an embodiment of the present invention. The cover top 108 is used to secure the PCB assembly including the USB flash drive inside the USB flash drive pen device 96. The cover top 108 is made from plastic resulting in a lighter USB flash drive pen device 96, however, other types of material may be used to manufacture the cover top 108.

The PCB slot channel 112 is used to secure the PCB assembly in place. The tabs 114 are used to secure the cover top 108 to a button bottom assembly of the USB flash drive pen device and the pin 110 is used to hold a spring in place inside the USB flash drive pen device 96.

Referring now to FIG. 5(b), a button bottom assembly 116 is shown to include a PCB slot channel 118, four slots 120, a pin 122, a base 124 and an end cap cut-out 126, in accordance with an embodiment of the present invention. The button bottom assembly 116 is made from plastic to make a lighter USB flash drive pen device 96. However, in other embodiments of the present invention other types of material may be used to manufacture the button bottom assembly 116. In other embodiments of the present invention the cover top 108 has a plurality of tabs.

For assembly the PCB assembly (not shown in FIG. 5(b)) slides onto the PCB slot channel 118 and the cover top 108 is placed on the top of the PCB assembly such that the four tabs 114 are snapped into the four slots 120 securing the PCB assembly to the button bottom assembly 116. In other embodiments of the present invention the top cover 108 is screwed or otherwise connected to the button bottom assembly 116. In other embodiments of the present invention the button bottom assembly 116 has a plurality of slots. In yet other embodiments of the present invention the button bottom assembly 116 has a plurality of holes rather than slots into which the tabs of the cover top 108 fit.

The pins 110 and 122 are for holding two springs in place inside the USB flash drive pen device 96. The bar 124 travels inside a slot to reach a locking position for deploying the USB plug connector 94 and is pushed back by the two springs to the original position for retracting the USB plug connector 94, as described in more detail hereinbeleow. The end cap cut-out 126 is for fitting an end cap onto the button bottom assembly 116.

Referring now to FIG. 5(c), an end cap 128 is shown to include a step 130, in accordance with an embodiment of the present invention. The end cap 128 is made from plastic, however, in other embodiments of the present invention the end cap 128 may be manufactured from other types of material. The end cap is pressed into the end cap cut-out 126 to close the button bottom assembly 116. The step 130 of the end cap 128 allows for tightly fitting the end cap 128 in the end cap cut-out 126. In other embodiments of the present invention the end cap 128 is screwed or otherwise attached to the end cap cut-out 126.

Referring now to FIG. 5(d), a standard PCB assembly 132 is shown to include a PCB substrate 134, four slots 136 and a USB plug connector 138, in accordance with an embodiment of the present invention. The PCB substrate 134 is coupled to the USB plug connector 138. The PCB substrate 134 is positioned approximately centered relative to the USB plug connector 138. The PCB substrate 134 includes all the hardware devices, such as integrated circuits (IC), of the USB flash drive. The slots 136 provide clearance for the tabs 114 of the top cover 108 to be snapped into the slots 120 of the button bottom assembly 116.

In other embodiments of the present invention alternative PCB assemblies are used in the USB flash drive pen device, two of which are indicated in FIGS. 5(e) and 5(f) hereinbelow.

Referring now to FIG. 5(e) a chip on board (COB) PCB assembly 140 is shown, in accordance with an embodiment of the present invention. The chip on board PCB assembly 140 is secured to the button bottom assembly 116 and used in the USB flash drive pen device 96, as described hereinbelow.

Referring now to FIG. 5(f), a super-slim PCB assembly 142 is shown, in accordance with an embodiment of the present invention. The super-slim PCB assembly 142 is secured to the button bottom assembly 116 (of FIG. 5(b)) and used in the USB flash drive pen device 96, as described hereinabove. The super-slim PCB assembly 142 may be manufactured using different methods such as Snap-together, Ultrasonic press and Thermal adhesive methods.

Referring now to FIG. 6(a), a detailed view of the internal components of a pusher assembly is shown to include a cover top 146, a PCB assembly 152, a button bottom assembly 164 and an end cap 156, in accordance with an embodiment of the present invention. The cover top 146 includes a pin 158 and four tabs 148. The button bottom assembly 164 includes a PCB slot channel 162, a pin 160, a bar 163, four slots 150 and a button bottom 154. The bar 163 includes a bar tip 165.

The PCB assembly 152 slides onto the PCB slot channel 162 until the end of the PCB substrate reaches the end of the PCB slot channel 162. The cover top 146 is secured to the button bottom assembly 164 by snapping the four tabs 148 into the four slots 150. The end cap 156 is secured to the end of the button bottom assembly 154 by being pressed thereonto. The two pins 158 and 160 are used to hold two springs in place inside the USB flash drive pen device 96. The bar 163 by traveling along a slot of a housing assembly causes the USB plug connector 94 to be pushed out of the housing unit 92, as described in more detail hereinbelow.

Referring now to FIG. 6(b), an assembled view of the pusher assembly 166 is shown, in accordance with an embodiment of the present invention. The pusher assembly 166 slides into a housing assembly and is secured thereto. The pusher assembly 166 and the housing assembly comprise the USB flash drive pen device 96, as described in more detail hereinbelow.

The pusher assembly 224 is secured inside the housing assembly 220 by the bar tip 165 of the bar 163 (shown in FIG. 6(a)). Specifically, once the bar 163 is pushed inside the slot 178 through the channel 182, the bar tip 165 stays in the slot 178 and cannot come out thereby securing the pusher assembly 224 inside the housing assembly 220.

Referring now to FIG. 7(a), a front view 170 and a back view 172 of a housing unit 173 are shown, in accordance with an embodiment of the present invention. The housing unit 173 is shown in the front view 170 to include a USB cut-out 175 and in the back view 172 to include two notches 174. The housing unit 173 and a stopper unit comprise a housing assembly.

To assemble the USB flash drive pen device 96 the pusher assembly 166 is guided inside the housing assembly to be secured thereto. In the deployed position the USB plug connector 94 protrudes out of the USB cut-out 175 for connection to a USB port. In the retracted position the USB plug connector 94 is pushed back in the housing unit 173. The purpose of the notches 174 is to provide a guide for sliding the stopper unit into the housing unit 173, as described hereinbelow.

Referring now to FIG. 7(b), a stopper unit 176 is shown to include a slot 178, two housing slots 180 and a channel 182, in accordance with an embodiment of the present invention. The housing slots 180 are first aligned with the notches 174 and then the stopper unit 176 is pressed into the housing unit 173 to be secured thereto. As the stopper unit 176 is pressed into the housing unit 172 the bar 163 of FIG. 6(a) is guided along the channel 182 into the slot 178. The main purpose of the bar 163 and the slot 178 is to provide a mechanism for controlling the distance the USB plug connector 94 travels out of the housing 173 in the deployed position.

Also shown in FIG. 7(b) is a top view 184 of the stopper unit which includes the slot 178, two housing slots 180 and the channel 182, in accordance with an embodiment of the present invention. The slot 178 is shown to include a second locking groove 194 and a first locking groove 196.

As the end button 106 of FIG. 4 is pushed in, the bar 163 starts moving along the slot 178 until the bar tip 165 is caught by the corner of the second locking groove 194 causing the bar tip 165 to drop into the second locking groove 194 to be secured therein. The USB plug connector is then in the deployed position having traveled out of the housing unit 170 a distance equal to the distance the bar 163 has traveled in the slot 178 to reach the second locking groove 194.

To retract the USB plug connector the end button 95 of FIG. 3 is pressed again to push the bar tip 165 out of the second locking groove 194 and into the first locking groove 196 wherein two compressed springs (not shown in FIG. 7(b)) push the bar 163 back to the original position assumed prior to deployment.

Referring now to FIG. 8(a), the internal components of a housing assembly is shown to include a housing unit 200, a stopper unit 206, two housing slots 202, two notches 204 and a slot 208, in accordance with an embodiment of the present invention. To assemble the housing assembly the housing slots 204 are aligned with the notches 202 and the stopper unit 206 is pressed into the housing unit 200 until the exposed cross sectional surfaces of the two units are flush.

Referring now to FIG. 8(b), an assembled view of the housing assembly 210 is shown to include the exposed cross sectional surfaces of the housing unit 212 and stopper unit 214, in accordance with an embodiment of the present invention. As indicated in FIG. 8(b) the exposed cross sectional surface of the stopper unit 214 is flush with the exposed cross sectional surface of the housing unit 212.

Referring now to FIG. 9(a), the internal components of a USB flash drive pen device are shown to include the housing assembly 220, the pusher assembly 224 and two springs 228 and 230, in accordance with an embodiment of the present invention. The housing assembly 220 includes the channel 222. The pusher assembly 224 the bar 226 with a bar tip 227, a pin 232 and another pin located on the underside of the pusher assembly 224. To assemble the USB flash drive pen device the springs 228 and 230 are dropped into the housing assembly 220 and the pusher assembly 224 is pressed into the housing assembly 220 such that the bar 226 is aligned with the channel 222 and passes therethrough to reach the slot in the stopper assembly (not shown in FIG. 9(a)). In this way the housing assembly 220 at least partially encloses the pusher assembly 224. The pin 232 and the other pin are in contact with the tip of the springs 230 and 228, respectively.

In the deployed position, the springs 228 and 230 are compressed and press against the pins, but the second locking groove 194 (in FIG. 7(b)) prevents the bar 226 from returning to the original position. When the end button is pressed again to retract the USB plug connector the bar tip 227 is pushed out of the second locking groove 194 into the first locking groove 196 and the springs 228 and 230 being further compressed push the bar 226 back to the original position. Hence the USB plug connector is retracted inside the housing assembly 220.

Referring now to FIG. 9(b), an assembled view of a USB flash drive pen device 240 in the deployed position is shown to include the end button 242 and the USB plug connector 244, in accordance with an embodiment of the present invention. The end button has been pushed in to cause the pusher assembly to deploy the USB plug connector 244, as described hereinabove.

The USB flash drive pen device 90 shown in FIG. 3 is made to be relatively short and compact. Since the casing 92 and some of the internal components are made out of plastic the USB flash drive pen device 90 is substantially lighter than the conventional units and may easily be carried in the user's pocket. Additionally, by using plastic for manufacturing a large quantity of the USB flash drive pen device 90 the cost of material, molding tool and assembly process are substantially lower than using metal parts. In use the USB flash drive pen device 90 functions similar to a pen by allowing the user to simply press the end button for deploying and retracting the USB plug connector without having to open or close any cover.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A universal serial bus (USB) flash drive pen device comprising:
   a pusher assembly including a USB flash drive and a USB plug connector; and
   a housing assembly at least partially enclosing said pusher assembly for deploying said USB plug connector, said USB flash drive being coupled to said USB plug connector, said pusher assembly operative to retract said USB plug connector into said housing assembly when an end cap is pressed and to deploy said USB plug connector when said end cap is pressed again, said USB flash drive pen device for deploying said USB plug connector to couple said USB flash drive to a USB port.

2. A universal serial bus (USB) flash drive pen device as recited in claim 1 further including a standard printed circuit board (PCB) assembly having a PCB substrate and a USB plug connector, said PCB substrate including hardware devices for said USB flash drive, said PCB substrate being coupled to said USB plug connector.

3. A universal serial bus (USB) flash drive pen device as recited in claim 1 further including a chip on board (COB) printed circuit board (PCB) assembly having said USB plug connector, said chip on board PCB assembly including hardware devices of said USB flash drive.

4. A universal serial bus (USB) flash drive pen device as recited in claim 1 further including a super-slim printed circuit board (PCB) assembly having said USB plug connector, said super-slim PCB assembly including hardware devices of said USB flash drive.

5. A universal serial bus (USB) flash drive pen device as recited in claim 2 where said pusher assembly including a button assembly having a plurality of slots to secure said standard printed circuit board (PCB)assembly, said pusher assembly further including a cover top having a plurality of tabs to secure said standard PCB assembly to said button bottom assembly.

6. A universal serial bus (USB) flash drive pen device as recited in claim 5 wherein said button bottom assembly further including a printed circuit board (PCB) slot channel having said plurality of slots, said standard PCB assembly being positioned on said PCB slot channel, said cover top for securing said standard PCB assembly to said button bottom assembly by snapping said plurality of tabs into said plurality of slots.

7. A universal serial bus (USB) flash drive pen device as recited in claim 5 wherein said button bottom assembly further including an end cap being pressed into the end of said button bottom assembly for closing thereof, said end cap having a step for tightly fitting into the end of said button bottom assembly.

8. A universal serial bus (USB) flash drive pen device as recited in claim 7 wherein said button bottom assembly including a bar having a bar tip, said end cap being pressed to push said bar for deploying said USB plug connector, said bar for aligning said pusher assembly inside said USB flash drive pen device.

9. A universal serial bus (USB) flash drive pen device as recited in claim 8 further including a housing unit and a stopper unit, said stopper unit including a channel, said bar being aligned with said channel for pushing said standard printed circuit board (PCB) assembly inside said housing assembly.

10. A universal serial bus (USB) flash drive pen device as recited in claim 9 wherein said housing unit including one or more notches, said stopper unit including one or more housing slots for alignment with said one or more notches to push said stopper unit inside said housing unit.

11. A universal serial bus (USB) flash drive pen device as recited in claim 9 wherein said housing unit for including a USB cut-out to allow said USB plug connector to travel out of said housing unit.

12. A universal serial bus (USB) flash drive pen device as recited in claim 10 wherein said stopper unit for including a slot to allow said bar to travel therein to deploy said USB plug connector, said slot including a first and a second locking groove, said bar tip being positioned in said second locking groove for deploying said USB plug connector, said bar tip being positioned in said first locking groove to retract said USB plug connector.

13. A universal serial bus (USB) flash drive pen device as recited in claim 12 further including one or more springs being placed inside said housing assembly for retracting said USB plug connector, said button bottom assembly for including one or more pins to hold said one or more springs in place inside said housing assembly, said one or more springs for pushing back against said pusher assembly to retract said USB plug connector.

14. A method for manufacturing a universal serial bus (USB) plug connector comprising
coupling a housing assembly to a pusher assembly;
coupling a USB flash drive to a USB plug connector;
deploying the USB plug connector when an end cap is pressed;
retracting the USB plug connector into the housing assembly when said end cap is pressed again; and
coupling a USB flash drive pen device to a USB port.

15. A universal serial bus (USB) flash drive pen device comprising:
means for coupling a housing assembly to a pusher assembly;
means for coupling a USB flash drive to a USB plug connector;
means for deploying the USB plug connector when an end is pressed;
means for retracting the USB plug connector into the housing assembly when said endcap is pressed again; and
means for coupling a USB flash drive pen device to a USB port.

16. A universal serial bus (USB) flash drive pen device comprising:
a pusher assembly including a USB flash drive and a USB plug connector;
a front tube; and
a deploying subassembly positioned adjacent to said pusher assembly for deploying said USB plug connector, said USB flash drive being coupled to said USB plug connector, said deploying subassembly retracting said USB plug connector into said front tube when an end cap is pressed and deploying said USB plug connector when said end cap is pressed again, said USB flash drive pen device for deploying said USB plug connector to couple said USB flash drive to a USB port.

17. A universal serial bus (USB) flash drive pen device as recited in claim 16 wherein said deploying subassembly including an inner rotator, a pusher unit and a back tube, said pusher unit having one or more tabs, said back tube having a plurality of grooves, said back tube further having one or more wedges having corners, said inner-rotator having one or more big tabs, said inner-rotator including one or more wedges having tips, said one or more tabs of said pusher unit positioned inside said plurality of grooves of said back tube to deploy said USB plug connector, said tips of said wedges of said inner-rotator stopped at said corners of said wedges of said back tube to lock said USB plug connector in the deployed position.

18. A universal serial bus (USB) flash drive pen device as recited in claim 17 wherein said one or more tabs of said pusher unit positioned inside said plurality of grooves of said back tube to retract said USB plug connector, said tabs of said pusher unit stopped at the ends of said plurality of grooves of said back tube to lock said USB plug connector in the retracted position.

19. A method for manufacturing a universal serial bus (USB) flash drive pen device comprising:
positioning a deploying subassembly adjacent to a pusher subassembly for deploying a USB plug;
coupling a USB flash drive to the USB plug connector;
deploying said USB plug connector when an end cap is pressed;
retracting the USB plug connector into a front tube when said end cap is pressed again; and
coupling the USB flash drive to a USB port.

* * * * *